United States Patent
Knight et al.

(10) Patent No.: US 12,440,124 B2
(45) Date of Patent: Oct. 14, 2025

(54) METHOD FOR DETECTING AND CLASSIFYING A MOTOR SEIZURE

(71) Applicant: NEURO EVENT LABS OY, Tampere (FI)

(72) Inventors: Andrew Knight, Tampere (FI); Kaapo Annala, Tampere (FI)

(73) Assignee: NEURO EVENT LABS OY, Tampere (FI)

( * ) Notice: Subject to any disclaimer, the term of this patent is extended or adjusted under 35 U.S.C. 154(b) by 151 days.

(21) Appl. No.: 16/970,170

(22) PCT Filed: Feb. 15, 2019

(86) PCT No.: PCT/FI2019/050123
§ 371 (c)(1),
(2) Date: Aug. 14, 2020

(87) PCT Pub. No.: WO2019/158824
PCT Pub. Date: Aug. 22, 2019

(65) Prior Publication Data
US 2021/0100492 A1   Apr. 8, 2021

(30) Foreign Application Priority Data
Feb. 16, 2018 (GB) .................................. 1802588

(51) Int. Cl.
*A61B 5/11*     (2006.01)
*A61B 5/00*     (2006.01)
(Continued)

(52) U.S. Cl.
CPC .......... *A61B 5/1128* (2013.01); *A61B 5/4094* (2013.01); *A61B 5/7264* (2013.01);
(Continued)

(58) Field of Classification Search
CPC ... A61B 5/4094; A61B 5/7264; A61B 5/7405; A61B 5/742; A61B 5/1128; G06V 10/82;
(Continued)

(56) References Cited

U.S. PATENT DOCUMENTS

2006/0110049 A1   5/2006   Liang et al.
2015/0190085 A1   7/2015   Nathan et al.
(Continued)

FOREIGN PATENT DOCUMENTS

EP   0933726 A2   8/1999
EP   2123221 A2   11/2009
(Continued)

OTHER PUBLICATIONS

Webber, W. R. S., et al. "An approach to seizure detection using an artificial neural network (ANN)." Electroencephalography and clinical Neurophysiology 98.4 (1996): 250-272. (Year: 1996).*
(Continued)

*Primary Examiner* — Jennifer Robertson
*Assistant Examiner* — Nidhi N Patel
(74) *Attorney, Agent, or Firm* — Meunier Carlin & Curfman LLC (57) ABSTRACT

The invention relates to a method for detecting and classifying a motor seizure. The method comprises receiving video data of a patient; detecting a first anomaly in the video data as anomaly in movement of the patient; determining a video frame stack comprising the first anomaly; classifying the video frame stack using a pre-trained neural network to obtain a first classification; and determining a motor seizure type based on the first classification.

10 Claims, 5 Drawing Sheets

(51) Int. Cl.
   G06V 10/764 (2022.01)
   G06V 10/82 (2022.01)
   G06V 20/40 (2022.01)
   G06V 40/20 (2022.01)
(52) U.S. Cl.
   CPC ............ *A61B 5/7405* (2013.01); *A61B 5/742* (2013.01); *G06V 10/764* (2022.01); *G06V 10/82* (2022.01); *G06V 20/46* (2022.01); *G06V 40/20* (2022.01); *G06V 20/44* (2022.01)
(58) Field of Classification Search
   CPC ........ G06V 20/40; G06V 20/44; G06V 20/46; G06V 40/20; G06K 9/6271; G01N 2800/2857
   See application file for complete search history.

(56) References Cited

U.S. PATENT DOCUMENTS

| | | |
|---|---|---|
| 2016/0220169 A1 | 8/2016 | Girouard |
| 2016/0302714 A1 | 10/2016 | Ng et al. |
| 2017/0035330 A1 | 2/2017 | Bunn et al. |
| 2017/0354341 A1 | 12/2017 | Kadambi |

FOREIGN PATENT DOCUMENTS

| | | |
|---|---|---|
| WO | 2017176511 A1 | 3/2017 |
| WO | 2017/062728 A1 | 4/2017 |

OTHER PUBLICATIONS

Subasi, Abdulhamit. "Automatic detection of epileptic seizure using dynamic fuzzy neural networks." Expert Systems with Applications 31.2 (2006): 320-328. (Year: 2006).*

Dalton, Anthony, et al. "Development of a body sensor network to detect motor patterns of epileptic seizures." IEEE transactions on biomedical engineering 59.11 (2012): 3204-3211. (Year: 2012).*

Supplementary European Search Report for EP Application No. 19754045 dated Dec. 4, 2020.

Ven De Vel, et al., "Non-EEG seizure detection systems and potential SUDEP prevention: State of the art Review and update," Seizure, Bailliere Tindall, London, GB, vol. 41, Jul. 27, 2016, pp. 141-153.

International Search Report and Written Opinion issued by the International Searching Authority (ISA/FI) in PCT Application No. PCT/FI2019/050123 on May 28, 2019. 17 pages.

International Preliminary Report on Patentability issued in PCT Application No. PCT/FI2019/050123 on Jun. 22, 2020. 9 pages.

Pediaditis, Matthew, Manolis Tsiknakis, Vangelis Kritsotakis, M. Góralczyk, S. Voutoufianakis, and Pelagia Vorgia. "Exploiting advanced video analysis technologies for a smart home monitoring platform for epileptic patients: Technological and legal preconditions." In 2012 International Conference on Telecommunications and Multimedia (TEMU), pp. 202-207. IEEE, 2012.

Combined Search and Examination Report issued by the UK Intellectual Property Office in Application No. GB1802588.2 on Aug. 17, 2018. 12 pages.

Karayiannis, Nicolaos B., et al. "Automated detection of videotaped neonatal seizures based on motion segmentation methods." Clinical Neurophysiology 117.7 (2006): 1585-1594.

Cattani, Luca, et al. "Monitoring infants by automatic video processing: A unified approach to motion analysis." Computers in biology and Medicine 80 (2017): 158-165.

Annala, Kaapo. "Revolutionizing epilepsy diagnosis and treatment." Jun. 2017, Intopalo [online], available from https://www.intopalo.com/blog/2017-06-21-revolutionizing-epilepsy-diagnosis-and-treatment/ [Accessed: Aug. 15, 2018].

* cited by examiner

METHOD FOR DETECTING AND CLASSIFYING A MOTOR SEIZURE

CROSS REFERENCE TO RELATED APPLICATIONS

This application is a national stage application filed under 35 U.S.C. § 371 of PCT/FI2019/050123 filed Feb. 15, 2019, which claims priority to and benefit of United Kingdom application number 1802588.2 filed Feb. 16, 2018, each of which is fully incorporated by reference and made a part hereof.

BACKGROUND

It is typical for certain medical conditions that seizures occur relating to abnormal excessive or synchronous neuronal activity in the brain. For example, patients with epilepsy suffer from seizures.

For finding effective treatment and/or planning possible surgical operations it is important to be aware of a patient's seizure history. Some patients have a diary for the seizures, but especially nightly seizures remain often unnoticed because the patient does not remember having a seizure during night, or a person surveilling with the patient does not notice the seizure.

Therefore, there is a need for improved methods for monitoring a patient.

SUMMARY

Various aspects of the invention include a method, an apparatus, a system and a computer readable medium comprising a computer program stored therein, which are characterized by what is stated in the independent claims. Various embodiments of the invention are disclosed in the dependent claims.

According to a first aspect, a method comprises receiving video data of a patient; detecting a first anomaly in the video data as anomaly in movement of the patient; determining a video frame stack comprising the first anomaly; classifying the video frame stack using a pre-trained neural network to obtain a first classification; and determining a motor seizure type based on the first classification.

According to an embodiment, the first anomaly in the video data is detected based on the video data, and the detecting comprises determining an actual feature over a video data segment, the actual feature representing actual movement of the patient; determining a predicted feature over the video data segment using a pre-trained neural network, the predicted feature representing predicted movement of the patient; determining a difference between the actual feature and the predicted feature; and registering the actual feature as the first anomaly based on the difference.

According to an embodiment, the method further comprises receiving audio data from an audio sensor configured to detect sounds produced by the patient over time, and wherein the first anomaly in the video data is detected if intensity of the audio data exceeds a pre-defined threshold.

According to an embodiment, the method further comprises receiving audio data from an audio sensor configured to detect sounds produced by the patient over time; determining a second anomaly in the audio data as anomaly in sounds produced by the patient based on the audio data or based on the detected first anomaly; determining an audio clip comprising the second anomaly; classifying the audio clip using a pre-trained neural network to obtain a second classification; and determining the seizure type based on the first classification and the second classification.

According to an embodiment, the method further comprises receiving depth data from means to acquire depth data, the means configured to detect movement of the patient over time; detecting a third anomaly in the depth data as anomaly in movement of the patient; determining a depth data frame stack comprising the third anomaly; classifying the depth data frame stack using a pre-trained neural network to obtain a third classification; and determining the seizure type based on the first classification and the third classification.

According to an embodiment, the method further comprises receiving depth data from means to acquire depth data, the means configured to detect movement of the patient over time; detecting a third anomaly in the depth data as anomaly in movement of the patient; determining a depth data frame stack comprising the third anomaly; classifying the depth data frame stack using a pre-trained neural network to obtain a third classification; and determining the seizure type based on the first classification, the second classification and the third classification.

According to an embodiment, the third anomaly in the depth data is detected based on the depth data, and the detecting comprises: determining an actual feature over a depth data segment, the actual feature representing actual movement of the patient; determining a predicted feature over the depth data segment using a pre-trained neural network, the predicted feature representing predicted movement of the patient; determining a difference between the actual feature and the predicted feature; and registering the actual feature as the third anomaly based on the difference.

According to an embodiment, the third anomaly in the depth data is detected based on the detected first anomaly or based on the detected second anomaly.

According to a second aspect, an apparatus comprises at least one processor, memory including computer program code, the memory and the computer program code configured to, with the at least one processor, cause the apparatus to perform the method according to any of the above embodiments.

According to a third aspect, a system comprises a video device; an apparatus comprising at least one processor, memory including computer program code, the memory and the computer program code configured to, with the at least one processor, cause the system to perform receiving video data of a patient; detecting a first anomaly in the video data as anomaly in movement of the patient; determining a video frame stack comprising the first anomaly; classifying the video frame stack using a pre-trained neural network to obtain a first classification; and determining a motor seizure type based on the first classification.

According to an embodiment, the first anomaly in the video data is detected based on the video data, and the detecting comprises: determining an actual feature over a video data segment, the actual feature representing actual movement of the patient; determining a predicted feature over the video data segment using a pre-trained neural network, the predicted feature representing predicted movement of the patient; determining a difference between the actual feature and the predicted feature; and registering the actual feature as the first anomaly based on the difference.

According to an embodiment, the system further comprises an audio sensor, the system further caused to perform receiving audio data from an audio sensor configured to detect sounds produced by the patient over time, and wherein the first anomaly in the video data is detected if intensity of the audio data exceeds a pre-defined threshold.

According to an embodiment, the system further comprises an audio sensor, the system further caused to perform receiving audio data from an audio sensor configured to detect sounds produced by the patient over time; determining a second anomaly in the audio data as anomaly in sounds produced by the patient based on the audio data or based on the detected first anomaly; determining an audio clip comprising the second anomaly; classifying the audio clip using a pre-trained neural network to obtain a second classification; and determining the seizure type based on the first classification and the second classification.

According to an embodiment, the system further comprises means for acquiring depth data, the system further caused to perform receiving depth data from means to acquire depth data, the means configured to detect movement of the patient over time; detecting a third anomaly in the depth data as anomaly in movement of the patient; determining a depth data frame stack comprising the third anomaly; classifying the depth data frame stack using a pre-trained neural network to obtain a third classification; and determining the seizure type based on the first classification and the third classification.

According to an embodiment, the system further comprises means for acquiring depth data, the system further caused to perform receiving depth data from means to acquire depth data, the means configured to detect movement of the patient over time; detecting a third anomaly in the depth data as anomaly in movement of the patient; determining a depth data frame stack comprising the third anomaly; classifying the depth data frame stack using a pre-trained neural network to obtain a third classification; determining the seizure type based on the first classification, the second classification and the third classification.

According to an embodiment, the third anomaly in the depth data is detected based on the depth data, and the detecting comprises: determining an actual feature over a depth data segment, the actual feature representing actual movement of the patient; determining a predicted feature over the depth data segment using a pre-trained neural network, the predicted feature representing predicted movement of the patient; determining a difference between the actual feature and the predicted feature; registering the actual feature as the third anomaly based on the difference.

According to an embodiment, the third anomaly in the depth data is detected based on the detected first anomaly or based on the detected second anomaly.

According to a fourth aspect, there is provided a computer program product embodied on a non-transitory computer readable medium, comprising computer program code configured to, when executed on at least one processor, cause an apparatus or a system to perform the method according to any of the above embodiments.

DESCRIPTION OF THE DRAWINGS

In the following, various embodiments of the invention will be described in more detail with reference to the appended drawings, in which.

DESCRIPTION OF EXAMPLE EMBODIMENTS

In the following, several embodiments of the invention will be described in the context of monitoring epileptic seizures. It is to be noted, however, that the invention is not limited to monitoring epileptic seizures or detecting and classifying of motor seizure. In fact, the different embodiments have applications in any environment where recognition of abnormal movement is required.

A seizure is a transient occurrence of signs and/or symptoms due to abnormal excessive or synchronous neuronal activity in the brain. Broadly, the seizures may be categorized into two main groups, focal seizures and generalized seizures. Focal seizures involve networks in one hemisphere of the brain. Generalized seizures involve networks in both hemispheres of the brain. Seizures can be further categorized into motor or non-motor seizures. Examples of focal motor seizure types comprise automatisms, atonic, clonic, epileptic spasms, hyperkinetic, myoclonic and tonic. Examples of generalized motor seizure types comprise tonic-clonic, clonic, tonic, myoclonic, myoclonic-tonic-clonic, myoclonic-atonic, atonic and epileptic spasms.

A generalized tonic-clonic seizure, also known as a convulsion, is a seizure with changes in motor activity. The seizure has tonic and clonic phases. Tonic means stiffening and clonic means rhythmical jerking changes in muscle activity. For a tonic phase it is typical e.g. that the muscles stiffen, air being forced past the vocal cords causes a cry or groan, the person loses consciousness and falls to the floor, and/or the person may bite their tongue or inside of their cheek. For a clonic phase, which usually comes after the tonic phase it is typical that the arms and usually the legs begin to jerk rapidly and rhythmically, bending and relaxing at the elbows, hips, and knees, and after a few minutes, the jerking slows and stops. These seizures generally last 1 to 3 minutes. A tonic-clonic seizure that lasts longer than 5 minutes needs immediate medical help.

Seizures can occur outside of the stereotypical generalized tonic-clonic type. Focal seizures originate in one hemisphere of the brain and typically exhibit asymmetric in the movement with respect to the body. In terms of motion, there are less stereotypical movement possibilities. This motion may have stiff muscular contraction elements resulting from tonic or dystonic movements, or rhythmic elements from clonic movements. Arrhythmic, twitch-like motion from myoclonic movements may also be present in some motor seizures.

Especially nightly seizures remain often unnoticed. Long-term surveillance in hospital is expensive and inconvenient for the patient. Therefore, it would be beneficial to have a monitoring system that can be easily installed at home.

Figure 1A:
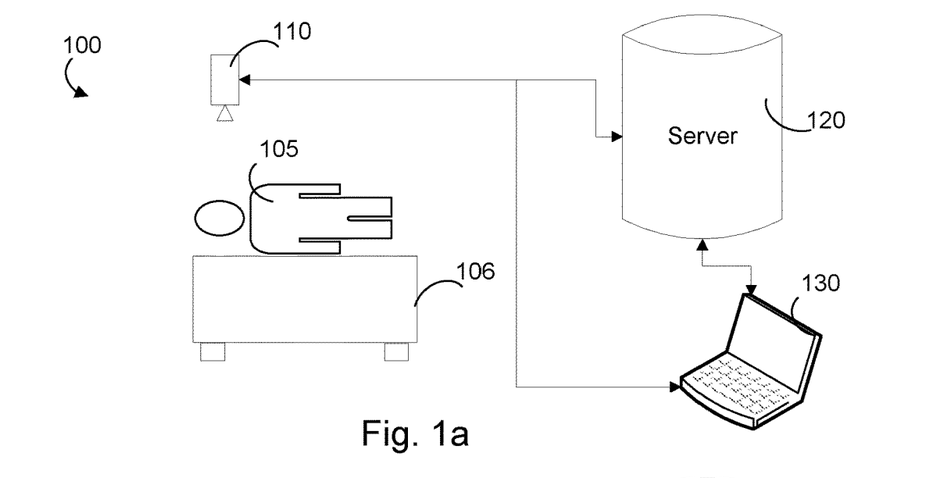
FIGS. 1a, 1b and 1c show, by way of examples, arrangements for monitoring a patient.
Figure 1B:
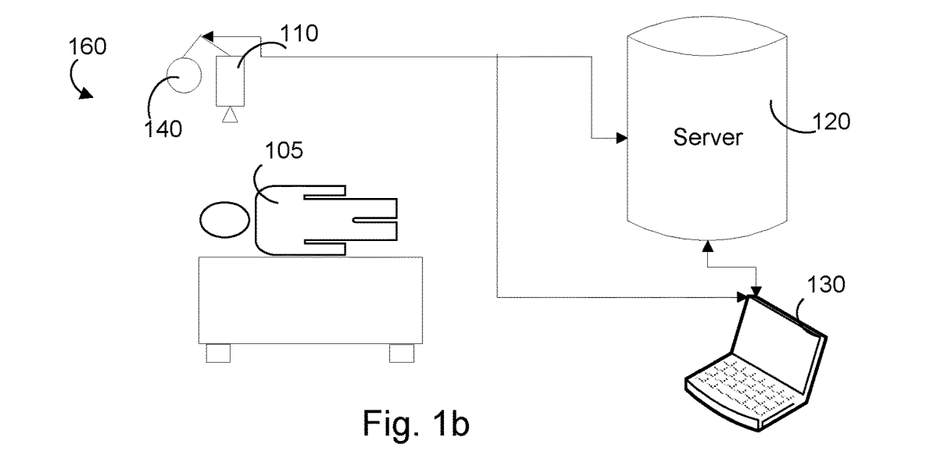
Figure 1C:
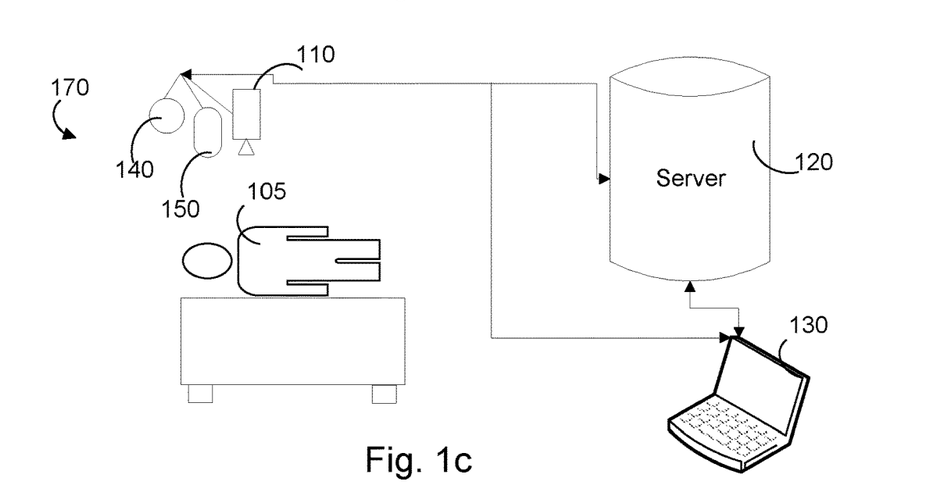

FIGS. 1a, 1b and 1c show, by way of examples, arrangements for monitoring a patient. FIG. 1a shows an arrangement 100, wherein a video camera 110 is arranged to capture video image of a patient 105. The patient 105 may be lying on a bed 106, e.g. sleeping. The video camera may be a night vision camera sensitive to near-infrared light.

The video camera may be connected to other devices, such as the one or more servers 120 and/or one or more user device 130. The user device may be e.g. a personal computer, a laptop or a smartphone. The video camera 110 may be controlled by another device, e.g. the user device 130. A user of the user device 130 may use a user interface of the user device for entering commands, parameters, etc. and the user may be provided with information from the video camera 110 via the user interface.

The video data captured by the video camera 110 may be transmitted to the server 120 and/or to the user device 130 for storing and for further analysis. The user device 130 may be used to access the data in the server 120.

FIG. 1b shows an arrangement 160 for monitoring a patient. In addition to the video camera 110, the arrangement comprises an audio sensor 140. The audio sensor 140 may be arranged to detect sounds from the environment, e.g. sounds produced by the patient 105 and/or sounds caused if the patient falls dawn of the bed 106.

As the video camera, the audio sensor 140 may be connected to other devices, such as the one or more servers 120 and/or the one or more user device 130. The sound data captured by the audio sensor 140 may be transmitted to the server and/or to the user device 130 for storing and/or for further analysis.

FIG. 1c shows an arrangement 170 for monitoring a patient. In addition to the video camera 110, the arrangement comprises means for acquiring depth data. Means for acquiring depth data 150 may be based e.g. on stereoscopic imaging techniques or on using a depth sensor. The arrangement 170 may further comprise the audio sensor 140.

The depth data may be acquired with two cameras near to one another, i.e. applying stereoscopy.

The depth sensor may be integrated with the video camera. The depth sensor may be configured to detect the distance between the sensor and the patient. The depth sensor may comprise e.g. an infrared (IR) projector and an IR camera. The IR projector projects a pattern of IR light towards an object, e.g. the patient. The IR light falls on the object as a dot pattern, which is sensed with the IR camera. On near objects the pattern is spread out and on far objects the pattern is dense. By calculating how the dots warp over the object and the distance between points, it may be determined how far away the object is from the depth sensor.

A depth map may be determined using the depth data, wherein the different distances may be indicated using different colors.

As the video camera and/or the audio sensor, the means for acquiring depth data 150 may be connected to other devices, such as the one or more servers 120 and/or the one or more user device 130. The depth data captured over time may be transmitted to the server and/or to the user device for storing and/or for further analysis.

Figure 2:
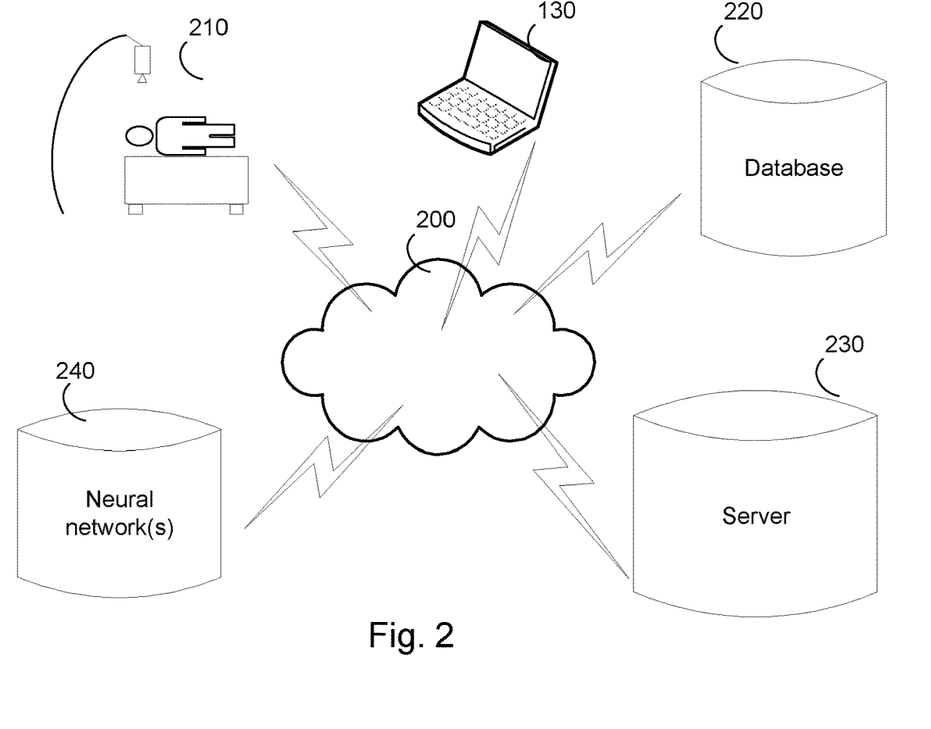
FIG. 2 shows, by way of an example, a system and devices for monitoring a patient

FIG. 2 shows, by way of an example, a system and devices for monitoring a patient. The different devices may be connected to each other via a communication connection 200, for example via Internet, a mobile communication network, Wireless Local Area Network (WLAN), Bluetooth®, or other contemporary and future networks. Different networks may be connected to each other by means of a communication interface. A monitoring arrangement 210 may be used to acquire data to be used in recognition of the motor seizure type. The acquired data may be stored in a database 220. The database may be a server or a group of servers. The servers may form a server system, e.g. a cloud. A server 230 may receive data from the database 220. The server 230 may communicate with databases comprising one or more neural networks 240. Neural network is a specific implementation of adaptive filters. Deep neural networks (DNN) are neural networks with several layers. Deep convolutional neural networks may be used when analyzing visual imagery. ResNeXt, CaffeNet and ResNet are examples of neural networks.

Figure 3:
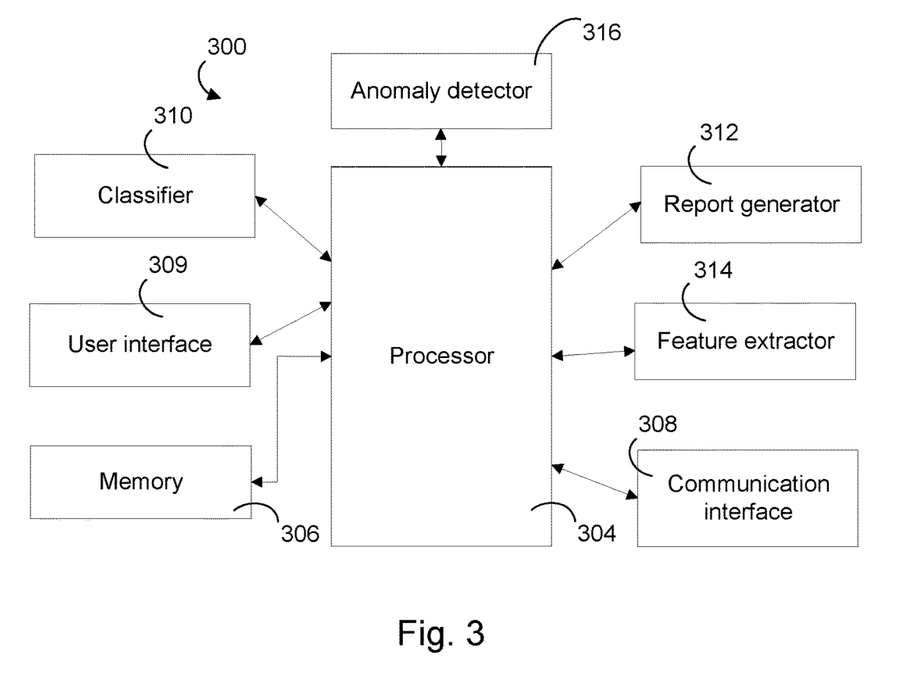
FIG. 3 shows, by way of an example, an apparatus for detecting and classifying a motor seizure type.

FIG. 3 shows, by way of an example, an apparatus 300 for detecting and classifying a motor seizure. The apparatus may be the server 230. The apparatus may receive data such as video data, depth data and/or audio data via a communication interface 308. The apparatus may comprise a memory 306 for storing data and computer program code which can be executed by a processor 304 to carry out various embodiment of the method as disclosed herein. The elements of the method may be implemented as a software component residing in the apparatus or distributed across several apparatuses.

Figure 4:
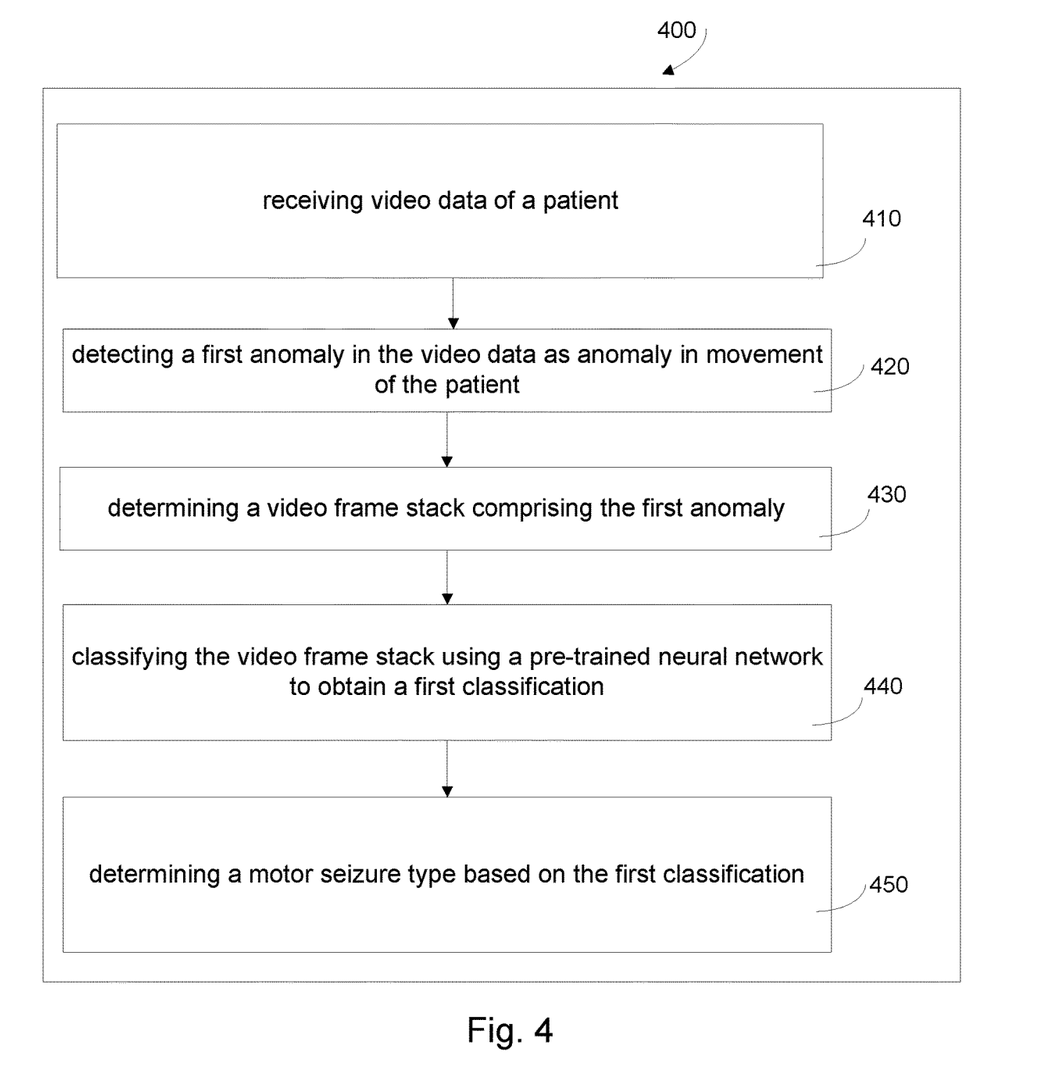
FIG. 4 shows, by way of an example, a flow diagram of a method for detecting and classifying a motor seizure type.

FIG. 4 shows, by way of an example, a flowchart of a method 400 for detecting and classifying a motor seizure. The method 400 comprises receiving 410 video data of a patient; detecting 420 a first anomaly in the video data as anomaly in movement of the patient; determining 430 a video frame stack comprising the first anomaly; classifying 440 the video frame stack using a pre-trained neural network to obtain a first classification; and determining 450 a motor seizure type based on the first classification.

The apparatus may comprise a feature extractor 314. The feature extractor may be configured to determine an actual feature over a video data segment. The actual feature represents actual movement of the patient during capture of the video data segment. There are different techniques to obtain features that can be classified by a classifier. Features with temporal extraction, such as optical flow, can be used to extract important movement from the video into smaller data, e.g. into a two-dimensional image, that may be classified by a machine learning model.

A dynamic image is an image which summarizes the appearance and dynamics of a video sequence. In other words, dynamic image may be considered as a feature that describes a larger data set. Dynamic images obtained from raw video data and/or dynamic images from optical flow transformation of the raw video and/or background subtraction methods may be combined to obtain the features to be classified. Movement of the patient occurring over a video segment creates texture in the dynamic image. For example, movement of limbs, movement of head, and/or breathing create texture into the dynamic image. Increase in breathing rate creates greater texture into the dynamic image.

The two-dimensional dynamic image may be processed using deep neural networks. The feature extractor may be configured to construct a dynamic image of a video sequence. The video sequence may comprise a predefined number of frames. Number of frames may be chosen so that the video sequence is at least the length of time of a minimum seizure duration. The minimum time may be set from 0.5 second to 1 second. Depending on the framerate of the camera, video sequence of 0.5 s-1 s may be e.g. from 15 frames to 30 frames. Number of frames may be e.g. 17, 20, 22, 25, 27 or 30 frames. Duration of the video sequence needs to be long enough to enable observation of significant human movement with the camera. On the other hand, duration of the video sequence needs to be short enough that non-significant movement are not accumulated in the feature extraction. The camera used for capture the video data may be a normal speed camera, or conventional machine vision camera, having a framerate of e.g. from 25 to 60 frames per second. The camera may have a framerate of e.g. 30 frames per second. The video data obtained with the camera should have a framerate that is comfortable for human eye. Consecutive video sequences, or video data segments, may be partly overlapping. For example, 10 frames of the 20 frames or 15 frames of the 30 frames may be overlapping with a previous segment.

The dynamic image may be constructed e.g. using optical flow field images, motion summary methods or dynamic textures. The different techniques may also be combined to construct a dynamic image. Optical flow estimates the optical flow between two image frames, e.g. consecutive video frames. The direction and magnitude of optical flow at each location of the image may be represented by vectors. Resulting image is a motion vector field.

Reference is made to "Action Recognition with Dynamic Image Networks" by Hakan Bilen et al. (Transactions on pattern analysis and machine intelligence), section 3.1 Constructing dynamic images, describing one example method for constructing dynamic images.

The video may be represented as a ranking function for its frames $I_1, \ldots, I_T$. Let $\psi(I_t) \in \mathbb{R}^d$ be a representation or feature vector extracted from each individual frame $I_t$ in the video. Let $$V_t = \frac{1}{t}\sum_{\tau=1}^{t} \psi(I_\tau)$$

be time average of these features up to time t. The ranking function associates to each time t a score $S(t|d) = \langle d | V_t \rangle$ where $d \in \mathbb{R}^d$ is a vector of parameters. The function parameters d are learned so that the scores reflect the rank of the frames in the video. Therefore, later times are associated with larger scores, i.e. $\forall \{q, t\}$ s.t. $q \succ t \Rightarrow S(q|d) > S(t|d)$.

Learning d is posed as a convex optimization problem using Ranking SVM (support vector machine) formulation:

$$d^* = \rho(I_1, \ldots, I_T; \psi) = \underset{d}{\mathrm{argmin}} E(d), \quad (1)$$

$$E(d) = \frac{\lambda}{2}\|d\|^2 + \frac{2}{T(T-1)} \times \sum_{q > t} \max\{0, 1 - S(q|d) + S(t|d)\}.$$

The first term in this objective function is the usual quadratic regularizer used in SVMs. The second term is a hinge-loss soft-counting how many pairs $q \succ t$ are incorrectly ranked by the scoring function. A pair is considered correctly ranked only if scores are separated by at least a unit margin, i.e. $S(q|d) > S(t|d) + 1$.

The optimizer to eq. (1) is written as a function $\rho(I_1, \ldots, I_T; \psi)$ that maps a sequence of T video frames to a single vector $d^*$. Since this vector contains enough information to rank all the frames in the video, it aggregates information from all of them and can be used as a video descriptor. The process of constructing $d^*$ from a sequence of video frames is known as rank pooling.

Rank pooling may be carried out in different ways. The map $\psi(\bullet)$ used in construction of $d^*$ may be set to be the Fisher Vector coding of a number of local features extracted from individual video frames, e.g. histogram of gradients (HOG), histogram of optical flow (HOF), motion boundary histograms (MBH) or improved dense trajectories (IDT). Alternatively, rank pooling may be applied directly to the RGB image pixels.

The apparatus 300 may comprise an anomaly detector 316. The anomaly detector may be configured to detect a first anomaly in the video data as anomaly in movement of the patient. The first anomaly may be detected based on the video data. In some cases, the movement of the patient may be minor, and the first anomaly may be detected based on the audio data as described later.

The anomaly detector may be configured to determine a predicted feature over the video data segment. The predicted feature may be determined using a pre-trained deep neural network (DNN). Input for the DNN may be the feature extracted by the feature extractor. The DNN may be pre-trained for normal sleeping data. Normal sleeping data may be captured from persons sleeping without any seizures. The predicted feature represents predicted movement of the patient, i.e. the next dynamic image may be predicted using the DNN. A dynamic image constructed from a real video data may be the input for the DNN to achieve a predicted dynamic image representing situation without anomalies.

The actual feature and the predicted feature may be compared to each other. For example, a subtraction image may be achieved by subtracting the actual feature from the predicted feature or by subtracting the predicted feature from the actual feature. For example, grey scale values of corresponding pixels of the actual feature and the predicted feature may be subtracted from each other. Mean square error between the actual feature and the predicted feature may be calculated. If a difference between the features exceeds a chosen threshold for a chosen number of consecutive frames, the video data segment (an event) may be registered as the first anomaly. The threshold may be patient specific. Also the chosen number of consecutive frames may be patient specific. For different types of seizures, a different number of frames may be chosen. Registering the video data segment as anomaly means that the actual feature, i.e. the actual dynamic image, represents a video sequence with anomaly, possibly movement caused by a seizure. The first anomaly is the anomaly detected in the video data. The anomaly detector may be configured to determine the video data segment, or a video frame stack, comprising the first anomaly.

The feature extraction, as described above for the video data, may analogously be applied on the depth data. The depth map is a two-dimensional representation of distance between the object and the depth sensor. The feature extractor may be configured to determine an actual feature over a depth data segment. The depth data segment may comprise a predefined number of frames, such as the video sequence. The actual feature represents actual depth data, i.e. actual distance between the depth sensor and the object (patient).

Referring to the situation, wherein the movement of the patient is minor, the first anomaly in the video data may be detected based on the audio data. Intensity of the audio data may be determined. For example, frequency content of the audio signal may be analyzed. If the intensity of the audio data exceeds a pre-defined threshold, it may be determined that the corresponding audio clip (having a duration of time) comprises an anomaly. The anomaly in the audio data may be due to groan typical to a tonic phase of a seizure. Then, corresponding video segment may be defined based on time information of the anomaly in the audio data and chosen for further analysis. For example, the corresponding video segment may be classified using a pre-trained neural network.

Alternatively, a feature may be extracted from the audio data. For example, an anomaly in the audio data may be determined using neural networks. The audio data may be a one-dimensional representation of sound over time. Therefore, to be able to apply feature extractions, as described above for the video data and/or depth data, the audio data needs to be transformed to obtain a two-dimensional representation of the audio data. For example, a power spectrum analysis may be used to create two-dimensional fingerprints of the audio data. The feature extractor may be configured to determine an actual feature over audio data segment, i.e. audio clip. Duration of the audio clip may be predefined to correspond to the duration of the video segment. The actual feature represents actual sounds produced by the patient during recording of the audio clip. Another example of a transformation is raster scanning that may be used to obtain a two-dimensional representation of the audio data.

The anomaly detector may be configured to detect a second anomaly in sounds produced by the patient based on the audio data. Alternatively, a time stamp derivable from the detected first anomaly may be used to find corresponding audio clip. The anomaly detector may be configured to determine a predicted feature over the audio clip. The predicted feature may be determined using a pre-trained DNN. The DNN may be pre-trained for normal audio data during sleeping. The predicted feature represents predicted sounds of the patient. The actual feature and the predicted feature may be compared to each other. For example, the actual feature may be subtracted from the predicted feature or the predicted feature may be subtracted from the actual feature. Mean square error may be calculated between the actual and predicted features. If a difference between the features exceeds a chosen threshold for a chosen number of frames, the audio clip (an event) may be registered as the second anomaly. The second anomaly is the anomaly detected in the audio data. The anomaly detector may be configured to determine the audio clip comprising the first anomaly.

The anomaly detector may be configured to detect a third anomaly in movement of the patient based on the depth data. Alternatively, a time stamp derivable from the detected first anomaly and/or the second anomaly may be used to find corresponding data segment of the depth data. The audio data intensity may be used to detect an anomaly in the depth data as described in the context of the video data. The anomaly detector may be configured to determine a predicted feature over the depth data segment. The predicted feature may be determined using a pre-trained DNN. The DNN may be pre-trained for normal depth data during sleeping. The predicted feature represents predicted movement of the patient as derived from the depth data. The actual feature and the predicted feature may be compared to each other. If a difference between the features exceed a chosen threshold for a chosen number of frames, the depth data segment may be registered as the third anomaly. The third anomaly is the anomaly detected in the depth data. The anomaly detector may be configured to determine the depth data frames comprising the third anomaly.

Use of the depth sensor to acquire depth data may increase the accuracy of movement detection. When using video data, it may be cumbersome to detect movement of the patient which occurs in direction towards the video camera. Movement of the patient which occurs in direction towards the observer may be more accurately detected using depth sensor(s) as observer(s).

The apparatus 300 may comprise a classifier 310. The classifier may be configured to classify the video frame stack using a pre-trained deep neural network (DNN). The pre-trained deep neural network may be fine-tuned. The classifier 310 may be configured to further classify the audio clip and/or the depth data segments using pre-trained DNNs.

Figure 5A:
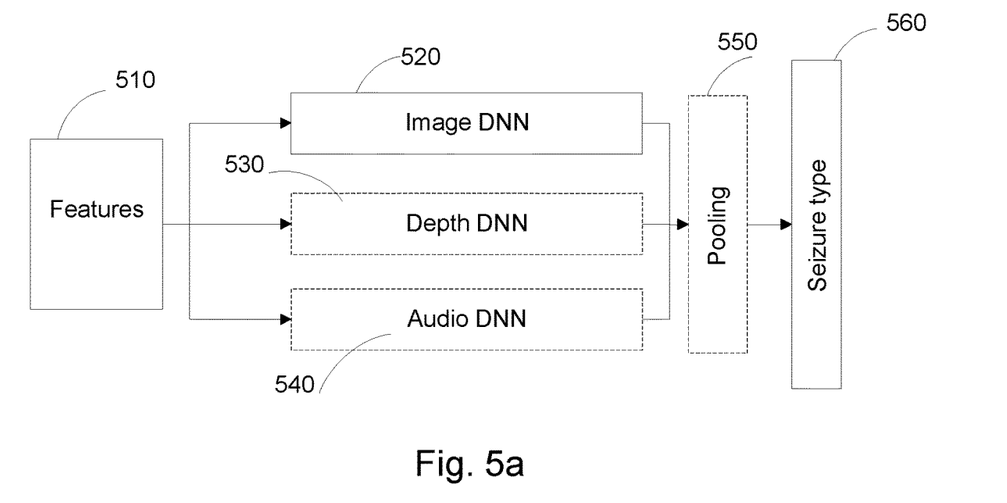
FIG. 5a shows, by way of an example, a flowchart of classification of features using deep neural networks.

FIG. 5a shows, by way of an example, a flowchart of classification of features using deep neural networks. One or more features 510 depicting an anomaly in data, e.g. in video data, depth data or audio data, is fed into pre-trained deep neural networks to obtain a classification. Pre-trained neural networks may comprise e.g. Image DNN 520, Depth DNN 530 and Audio DNN 540. Dashed line in the FIG. 5 describes that the use of depth data and audio data may be optional. The one or more classifications obtained as output from the DNN(s) may be used to determine a seizure type. If more than one classification is obtained, the classifications may be pooled to obtain a seizure type 560. Pooling 550 may mean averaging or max-pooling. In max-pooling maximum output is taken from a given pool as the most representative feature within that pool. For example, a region in an image is split into smaller regions that form a pool. The, the most interesting feature in the region of the image is chosen as an input to a next layer of a deep neural network.

ResNeXt, CaffeNet and ResNet are examples of deep neural networks. The deep neural networks may be pre-trained on two-dimensional image sets. Fine-tuning of the pre-trained networks may be carried out such that the video sequences comprising an anomaly are manually labelled according to a seizure type that occurred in the video sequence. For example, classification following an ILAE (International League Against Epilepsy) seizure classification may be used, or some other widely recognized classification system. By providing labels for features that are from visually identified seizures, the network may be trained to separate these seizures behaviors from normal behaviors. Backpropagation may be used in the fine-tuning of the network to adjust the weights of the network for a given patient. The labeling may be carried out by a medical doctor or a person qualified for recognizing seizure types. Referring back to FIG. 3, the apparatus may comprise a user interface 309 that is displayed on the user device 130. The labeling may be carried out by the user interface 309. Fine-tuning defines what kind of seizures may be classified with the classifier. In other words, data which is used for fine-tuning defines seizure types that may be classified with the classifier.

The determined video frame stack comprising the first anomaly may be classified using the pre-trained neural network to obtain a first classification. The first classification corresponds to a motor seizure type, and thus the motor seizure type may be determined based on the first classification.

Classification may be carried out for the determined audio clip comprising the second anomaly to obtain a second classification. The second classification corresponds to a motor seizure type, and thus the motor seizure type may be determined based on the second classification.

Classification may be carried out for the determined depth data frame stack comprising the third anomaly to obtain a third classification. The third classification corresponds to a motor seizure type, and thus the motor seizure type may be determined based on the third classification.

Obtained classifications may be combined into different combinations to determine the seizure type. For example, the first and the second classifications may be combined, the first and the third classifications may be combined, or the first, second and the third classifications may be combined, or the second and the third classifications may be combined. As an example of the combination, the first and the third classifications may give a seizure type Type1 and the second classification may give a seizure type Type2. Thus, it may be deduced that the seizure type is more probably Type 1. This may be further confirmed e.g. visually from the video data.

Figure 5B:
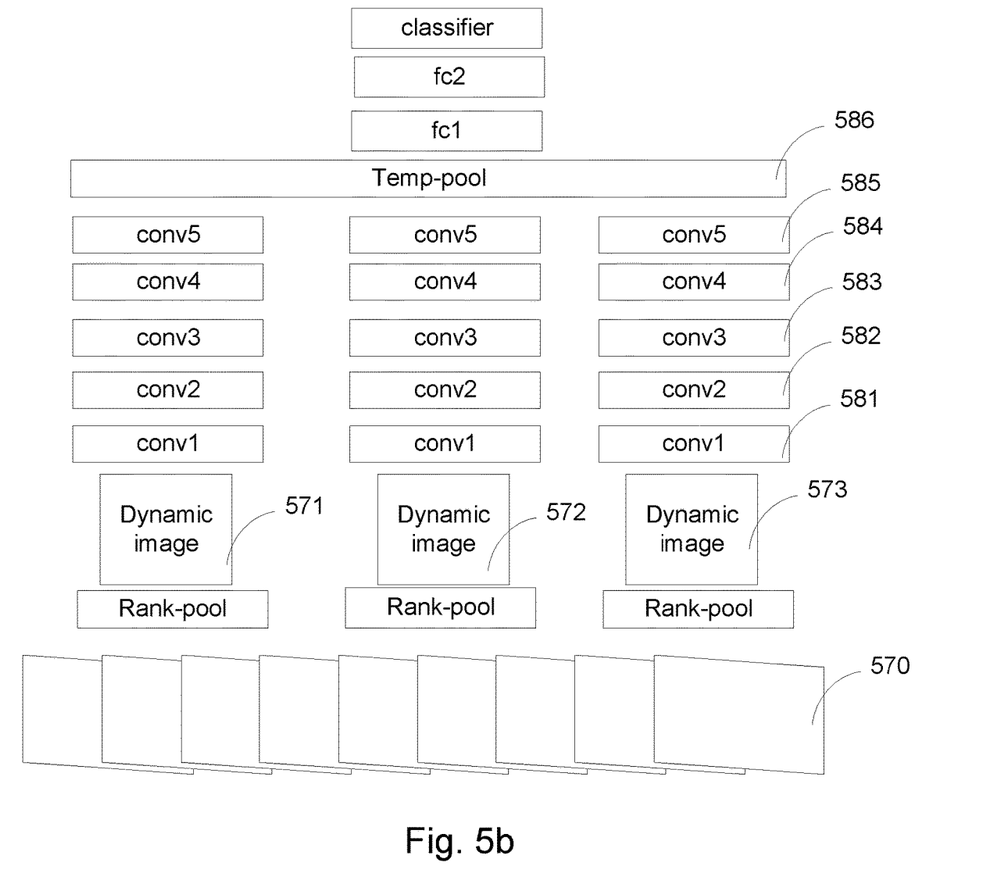
FIG. 5b shows, by way of an example, a neural network architecture.

FIG. 5b shows, by way of an example, an architecture of a neural network. Multiple dynamic images 571, 572, 573 may be constructed from the video data 570 by dividing the video into sequences, as described earlier. The sequences may be partly temporarily overlapping. The dynamic images may be used in identical parallel networks to provide classifications for the images. The classifications may be pooled together to get an output for a wider range in time. This is beneficial, since the movement progression of a motor seizure of a period of time may be longer than that captured by a dynamic image. Thus, the performance of the overall classification may be improved.

Rank-pooling may be applied for the input video frames 570 to aggregate the frames into dynamic images 571, 572, 573. It should be noted that the rank-pooling layer may be used whenever dynamic information must be pooled across time. Thus, rank-pooling layer may be moved to higher layers. The deep convolutional neural network may comprise convolutional layers 581, 582, 583, 584, 585. The number of the convolution layers may vary. The last convolutional layer may be followed by a temporal pooling layer 586 which may merge the dynamic images into one.

The apparatus may comprise prescribed elements, or fewer or more elements.

Figure 6:
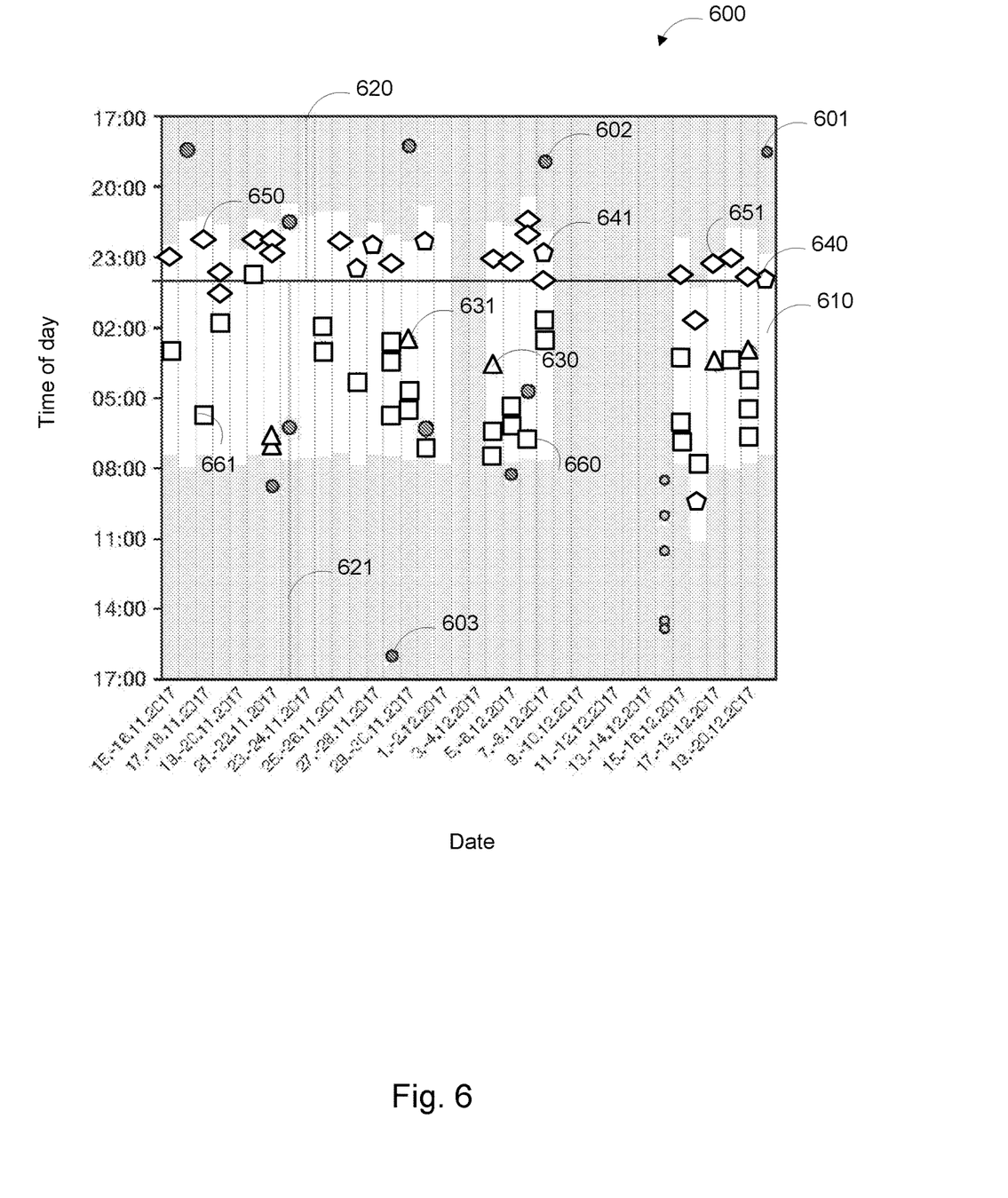
FIG. 6 shows, by way of an example, a report of detected seizures and seizure types.

The apparatus may further comprise a report generator 312. The user may see a report by the user interface, e.g. displayed on a display of a computer. FIG. 6 shows, by way of an example, a report 600 of detected seizures and seizure types. White bars 610 describe time windows when a patient has been monitored with the monitoring system. Points surrounded with black circles 601, 602, 603 are diary markings which may be marked to the interactive report by the user interface. Lines 620, 621 describe intervention. Intervention is an adjustment to the patient's therapy. For example, patient's medication may be changed, and/or an implanted neuromodulator may be tuned. A deep-brain stimulator, for example, may have thousands of possible parameter combinations. Clinician may tune the parameters and observe changes, via the report, in behavior after the intervention. In addition to the automated seizure behavior classification according to this application, visual confirmation may be used in combination. Seizures may be classified e.g. following an ILAE (International League Against Epilepsy) seizure classification. Triangles 630, 631 describe seizures of a type I.B.01 in the ILAE seizure classification: focal impaired motor-onset seizure. Pentagons 640, 641 describe seizures of a type I.B.03 in the ILAE seizure classification: focal impaired awareness clonic seizure. Diamonds 650, 651 describe seizures of a type I.B.01 but is an unpropagated instance. This means that the seizure has the same onset as the type I.B.01 but does not continue to a full seizure. Squares 660, 661 describe seizures of a type I.B.03, but is an unpropagated instance. This means that the seizure has the same onset as the type I.B.03 but does not continue to a full seizure.

To be able to perform the motion estimation based on the video data is convenient for the patient, since there is no need for the patient to wear any reflective markers or sensors.

The various embodiments may provide advantages. Classification of a seizure type may be carried out fast. Video based monitoring does not disturb sleep of the patient. Patient does not need to wear inconvenient sensors, e.g. EEG electrodes. Also the unreliable ways of recording may be avoided. For example, misplaced electrodes or movement of the electrodes may cause artifacts to the recorded EEG. Medical doctors may verify visually what has happened during the night. Moreover, it is beneficial to have quantitative data about seizures, such as intensity and duration. An alarm system may be connected to the monitoring system. When an alarm is activated, surveilling person may help the patient by turning the patient to a safer position, or in some cases, the patient may be given drugs to cause coma.

It is obvious that the present invention is not limited solely to the above-presented embodiments, but it can be modified within the scope of the appended claims.

The invention claimed is:

1. A method for detecting a motor seizure type of an epileptic seizure of a patient, said method to be performed by a patient monitoring system comprising a processor operatively connected with
   a video camera,
   a depth sensor or a stereoscopic imaging equipment,
   an audio sensor, and
   one or more databases comprising a first pre-trained neural network, a second pre-trained neural network and a third pre-trained neural network, the method comprising:
   receiving, by the video camera, video data of the patient;
      detecting, by an apparatus operatively connected to the video camera, a first anomaly in the video data as anomaly in movement of the patient, wherein the first anomaly in the video data is detected based on the video data, and the detecting comprises:
         determining, by the apparatus, an actual feature over a video data segment, the actual feature representing actual movement of the patient;
         determining, by the apparatus, a predicted feature over the video data segment using the first pre-trained neural network, wherein the first pre-trained neural network is pre-trained for normal sleeping data captured from persons sleeping without any seizures, the predicted feature representing predicted movement of the patient;
         determining, by the apparatus, a difference between the actual feature and the predicted feature; and
         registering, by the apparatus, the actual feature as the first anomaly based on the difference; and the method comprises:
   determining, by the apparatus, a video frame stack comprising the first anomaly;
   classifying, by the apparatus, the video frame stack using the first pre-trained neural network, that is a pre-trained image neural network, to obtain a first classification, wherein the first classification is based on a seizure classification for epileptic seizures;
   receiving audio data from the audio sensor configured to detect sounds produced by the patient over time;
   transforming the audio data to obtain a two-dimensional representation of the audio data;
   determining a second anomaly in the two-dimensional representation of the audio data as anomaly in sounds produced by the patient based on the audio data or based on the detected first anomaly;
   determining an audio clip comprising the second anomaly;
   classifying the audio clip using the second pre-trained neural network, that is a pre-trained audio neural network, to obtain a second classification, wherein the second classification is based on the seizure classification for epileptic seizures;
   receiving depth data from the stereoscopic imaging equipment or the depth sensor configured to detect movement of the patient over time;

detecting a third anomaly in the depth data as anomaly in movement of the patient;
determining a depth data frame stack comprising the third anomaly;
classifying the depth data frame stack using the third pre-trained neural network, that is a pre-trained depth neural network, to obtain a third classification, wherein the third classification is based on the seizure classification for epileptic seizures; and
determining, by the apparatus, the motor seizure type based on the first classification, the second classification, and the third classification by:
applying pooling to respective outputs of the pre-trained image neural network, the pre-trained audio neural network, and the pre-trained depth neural network to obtain a combined output;
determining the motor seizure type based on the combined output; and
generating, for display on a graphical user interface of a user device operatively connected to the processor, an interactive report comprising the motor seizure type determined based on the combined output, wherein the interactive report further comprises a plurality of motor seizure types classified by the patient monitoring system.

2. The method according to claim 1, wherein the first anomaly in the video data is detected if intensity of the audio data exceeds a pre-defined threshold.

3. The method according to claim 1, wherein the third anomaly in the depth data is detected based on the depth data, and the detecting comprises:
determining an actual feature over a depth data segment, the actual feature representing actual movement of the patient;
determining a predicted feature over the depth data segment using a pre-trained neural network that is pre-trained for normal depth data during sleeping, the predicted feature representing predicted movement of the patient;
determining a difference between the actual feature and the predicted feature; and
registering the actual feature as the third anomaly based on the difference.

4. The method according to claim 1, wherein the third anomaly in the depth data is detected based on the detected first anomaly or based on the second anomaly.

5. An apparatus for detecting a motor seizure type of an epileptic seizure of a patient, said apparatus comprising at least one processor, operatively connected with
a video camera,
a depth sensor or a stereoscopic imaging equipment,
an audio sensor, and
one or more databases comprising a first pre-trained neural network, a second pre-trained neural network and a third pre-trained neural network; and memory including computer program code, wherein the memory and the computer program code are configured to, with the at least one processor, cause the apparatus to perform:
receiving, by the apparatus from the video camera operatively connected to the apparatus, video data captured by the video camera of the patient;
detecting, by the apparatus, a first anomaly in the video data as anomaly in movement of the patient, wherein the first anomaly in the video data is detected based on the video data, and the detecting comprises:
determining, by the apparatus, an actual feature over a video data segment, the actual feature representing actual movement of the patient;
determining, by the apparatus, a predicted feature over the video data segment using a first pre-trained neural network, wherein the first pre-trained neural network is pre-trained for normal sleeping data captured from persons sleeping without any seizures, the predicted feature representing predicted movement of the patient;
determining, by the apparatus, a difference between the actual feature and the predicted feature; and
registering, by the apparatus, the actual feature as the first anomaly based on the difference; and wherein the memory and the computer program code are configured to, with the at least one processor, cause the apparatus to perform:
determining, by the apparatus, a video frame stack comprising the first anomaly;
classifying, by the apparatus, the video frame stack using the first pre-trained neural network, that is a pre-trained image neural network, to obtain a first classification, wherein the first classification is based on a seizure classification for epileptic seizures;
receiving audio data from the audio sensor configured to detect sounds produced by the patient over time;
transforming the audio data to obtain a two-dimensional representation of the audio data;
determining a second anomaly in the two-dimensional representation of the audio data as anomaly in sounds produced by the patient based on the audio data or based on the detected first anomaly;
determining an audio clip comprising the second anomaly;
classifying the audio clip using the second pre-trained neural network, that is a pre-trained audio neural network, to obtain a second classification, wherein the second classification is based on the seizure classification for epileptic seizures;
receiving depth data from the stereoscopic imaging equipment or the depth sensor configured to detect movement of the patient over time;
detecting a third anomaly in the depth data as anomaly in movement of the patient;
determining a depth data frame stack comprising the third anomaly;
classifying the depth data frame stack using the third pre-trained neural network, that is a pre-trained depth neural network, to obtain a third classification, wherein the third classification is based on the seizure classification for epileptic seizures; and
determining, by the apparatus, the motor seizure type based on the first classification, the second classification, and the third classification by
applying pooling to respective outputs of the pre-trained image neural network, the pre-trained audio neural network, and the pre-trained depth neural network to obtain a combined output;
determining the motor seizure type based on the combined output; and
generating, for display on a graphical user interface of a user device operatively connected to the processor, an interactive report comprising the motor seizure type determined based on the combined output, wherein the interactive report further comprises a plurality of motor seizure types classified by the apparatus.

6. A system for detecting a motor seizure type of an epileptic seizure of a patient, comprising
a video device;
an audio sensor configured to detect sounds produced by the patient over time;
stereoscopic imaging equipment or a depth sensor configured to detect movement of the patient over time; and
an apparatus operatively connected to the video device, the audio sensor, the stereoscopic imaging equipment or the depth sensor, and one or more databases comprising a first pre-trained neural network, a second pre-trained neural network and a third pre-trained neural network, said apparatus comprising at least one processor, memory including computer program code, the memory and the computer program code configured to, with the at least one processor, cause the system to perform
receiving, by the apparatus, video data captured by the video device of the patient;
detecting, by the apparatus, a first anomaly in the video data as anomaly in movement of the patient; wherein the first anomaly in the video data is detected based on the video data, and the detecting comprises:
  determining, by the apparatus, an actual feature over a video data segment, the actual feature representing actual movement of the patient;
  determining, by the apparatus, a predicted feature over the video data segment using a first pre-trained neural network, wherein the first pre-trained neural network is pre-trained for normal sleeping data captured from persons sleeping without any seizures, the predicted feature representing predicted movement of the patient;
  determining, by the apparatus, a difference between the actual feature and the predicted feature; and
  registering, by the apparatus, the actual feature as the first anomaly based on the difference; wherein the memory and the computer program code are configured to, with the at least one processor, cause the system to perform:
determining, by the apparatus, a video frame stack comprising the first anomaly;
classifying the video frame stack using the first pre-trained neural network, that is a pre-trained image neural network, to obtain a first classification, wherein the first classification is based on a seizure classification for epileptic seizures;
receiving audio data from the audio sensor;
transforming the audio data to obtain a two-dimensional representation of the audio data;
determining a second anomaly in the two-dimensional representation of the audio data as anomaly in sounds produced by the patient based on the audio data or based on the detected first anomaly;
determining an audio clip comprising the second anomaly;
classifying the audio clip using the second pre-trained audio neural network, that is a pre-trained audio neural network, to obtain a second classification, wherein the second classification is based on the seizure classification for epileptic seizures;
receiving depth data from the stereoscopic imaging equipment or the depth sensor;
detecting a third anomaly in the depth data as anomaly in movement of the patient;
determining a depth data frame stack comprising the third anomaly;
classifying the depth data frame stack using the third pre-trained neural network, that is a pre-trained depth neural network, to obtain a third classification, wherein the third classification is based on the seizure classification for epileptic seizures; and
determining, by the apparatus, the motor seizure type based on the first classification, the second classification, and the third classification by:
applying pooling to respective outputs of the pre-trained image neural network, the pre-trained audio neural network, and the pre-trained depth neural network to obtain a combined output;
determining the motor seizure type based on the combined output; and
generating, for display on a graphical user interface of a user device operatively connected to the processor, an interactive report comprising the motor seizure type determined based on the combined output, wherein the interactive report further comprises a plurality of motor seizure types classified by the apparatus.

7. The system according to claim 6, wherein the first anomaly in the video data is detected if intensity of the audio data exceeds a pre-defined threshold.

8. The system according to claim 6, wherein the third anomaly in the depth data is detected based on the depth data, and the detecting comprises:
  determining an actual feature over a depth data segment, the actual feature representing actual movement of the patient;
  determining a predicted feature over the depth data segment using a pre-trained neural network that is pre-trained for normal depth data during sleeping, the predicted feature representing predicted movement of the patient;
  determining a difference between the actual feature and the predicted feature; and
  registering the actual feature as the third anomaly based on the difference.

9. The system according to claim 6, wherein the third anomaly in the depth data is detected based on the detected first anomaly or based on the second anomaly.

10. A computer program product embodied on a non-transitory computer readable medium for detecting a motor seizure type of an epileptic seizure of a patient, said computer program product comprising computer program code configured to, when executed on at least one processor of a system operatively connected to a video camera, a depth sensor or a stereoscopic imaging equipment,
an audio sensor, and
one or more databases comprising a first pre-trained neural network, a second pre-trained neural network and a third pre-trained neural network, cause the system to perform:
  receiving, by the system, video data captured by the video camera of the patient;
  detecting, by the system, a first anomaly in the video data as anomaly in movement of the patient, wherein the first anomaly in the video data is detected based on the video data, and the detecting comprises:
    determining, by the system, an actual feature over a video data segment, the actual feature representing actual movement of the patient;
    determining, by the system, a predicted feature over the video data segment using a first pre-trained neural network, wherein the first pre-trained neural network is pre-trained for normal sleeping data captured from persons sleeping without any seizures, the predicted feature representing predicted movement of the patient;

determining, by the system, a difference between the actual feature and the predicted feature; and registering, by the system, the actual feature as the first anomaly based on the difference; and wherein said computer program product comprising computer program code configured to, when executed on the at least one processor, cause the system to perform:

determining, by the system, a video frame stack comprising the first anomaly;

classifying, by the system, the video frame stack using the first pre-trained neural network, that is a pre-trained image neural network, to obtain a first classification, wherein the first classification is a seizure classification for epileptic seizures;

receiving audio data from the audio sensor configured to detect sounds produced by the patient over time;

transforming the audio data to obtain a two-dimensional representation of the audio data;

determining a second anomaly in the two-dimensional representation of the audio data as anomaly in sounds produced by the patient based on the audio data or based on the detected first anomaly;

determining an audio clip comprising the second anomaly;

classifying the audio clip using the second pre-trained audio neural network, that is a pre-trained audio neural network, to obtain a second classification, wherein the second classification is based on the seizure classification for epileptic seizures;

receiving depth data from the stereoscopic imaging equipment or the depth sensor configured to detect movement of the patient over time;

detecting a third anomaly in the depth data as anomaly in movement of the patient; determining a depth data frame stack comprising the third anomaly;

classifying the depth data frame stack using the third pre-trained depth neural network, that is a pre-trained depth neural network, to obtain a third classification, wherein the third classification is based on the seizure classification for epileptic seizures; and determining, by the system, a motor seizure type based on the first classification, the second classification, and the third classification by:

applying pooling to respective outputs of the pre-trained image neural network, the pre-trained audio neural network, and the pre-trained depth neural network to obtain a combined output;

determining the motor seizure type based on the combined output;

generating, for display on a graphical user interface of a user device operatively connected to the processor, an interactive report comprising the motor seizure type determined based on the combined output, wherein the interactive report further comprises a plurality of motor seizure types classified by the system.

* * * * *